US012638059B2

(12) United States Patent
    Park

(10) Patent No.: US 12,638,059 B2
(45) Date of Patent: May 26, 2026

(54) BRAKE SYSTEM AND METHOD FOR CONTROLLING THE SAME

(71) Applicant: HL MANDO CORPORATION, Pyeongtaek-si (KR)

(72) Inventor: Jaehyun Park, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 642 days.

(21) Appl. No.: 18/111,270

(22) Filed: Feb. 17, 2023

(65) Prior Publication Data

US 2023/0265900 A1 Aug. 24, 2023

(30) Foreign Application Priority Data

Feb. 21, 2022 (KR) ........................ 10-2022-0022412

(51) Int. Cl.
    *F16D 66/02* (2006.01)
    *F16D 66/00* (2006.01)
(52) U.S. Cl.
    CPC ...... *F16D 66/022* (2013.01); *F16D 2066/005* (2013.01); *F16D 2066/006* (2013.01)
(58) Field of Classification Search
    CPC ............. F16D 66/022; F16D 2066/005; F16D 2066/006; B60T 17/22; B60T 17/221; B60T 1/06; B60T 8/17; B60T 13/662; B60T 13/745
    USPC ...................................................... 188/1.11 L
    See application file for complete search history.

(56) References Cited

U.S. PATENT DOCUMENTS

| | | | |
|---|---|---|---|
| 6,847,869 B2 * | 1/2005 | Dewberry ............. | B60T 17/228 701/33.9 |
| 2016/0032994 A1 * | 2/2016 | Sakashita ................ | F16D 65/18 188/72.3 |
| 2019/0047537 A1 * | 2/2019 | Choi .................... | G01R 15/202 |
| 2019/0084548 A1 * | 3/2019 | Ohazulike .............. | F16D 66/00 |
| 2019/0135257 A1 * | 5/2019 | Medinei ................ | B60T 13/662 |

FOREIGN PATENT DOCUMENTS

| | | |
|---|---|---|
| JP | 2019-056482 A | 4/2019 |
| KR | 10-2016-0016610 A | 2/2016 |

OTHER PUBLICATIONS

Office Action From Korean Patent Office Dated 2025-10-24 Issued for Korean Patent Application No. 10-2022-0022412.

* cited by examiner

*Primary Examiner* — Robert A. Siconolfi
*Assistant Examiner* — San M Aung
(74) *Attorney, Agent, or Firm* — Harvest IP Law, LLP

(57) ABSTRACT

A brake system and a method for controlling the same are proposed. The brake system includes a brake unit including a friction member to perform braking according to a driver's request while a vehicle is driving, a drive unit receiving a rotating force of an actuator and providing a driving force to the brake unit, a hydraulic supply unit providing a hydraulic pressure to the drive unit, and an electronic control unit configured to control an operation of the actuator and the hydraulic supply unit. The electronic control unit includes a memory unit to store vehicle information at a replacement time when the friction member is replaced.

13 Claims, 3 Drawing Sheets

START

REQUEST REPLACEMENT OF FRICTION MEMBER OF BRAKE UNIT --S205

RELEASE COUPLING BETWEEN BRAKE UNIT AND DRIVE UNIT --S210

PERFORM REPLACEMENT OF FRICTION MEMBER OF BRAKE UNIT --S215

STORE VEHICLE INFORMATION (VEHICLE DRIVING MILEAGE AND NUMBER OF OPERATIONS TIMES OF BRAKE UNIT) IN MEMORY UNIT OF ELECTRONIC CONTROL UNIT --S220

RESTORE COUPLING BETWEEN BRAKE UNIT AND FRICTION MEMBER --S225

ELECTRONIC CONTROL UNIT CHECKS HYDRAULIC AUXILIARY CONDITION WHEN VEHICLE BRAKING IS REQUESTED --S230

PERFORM VEHICLE BRAKING --S235

END

FIG. 3

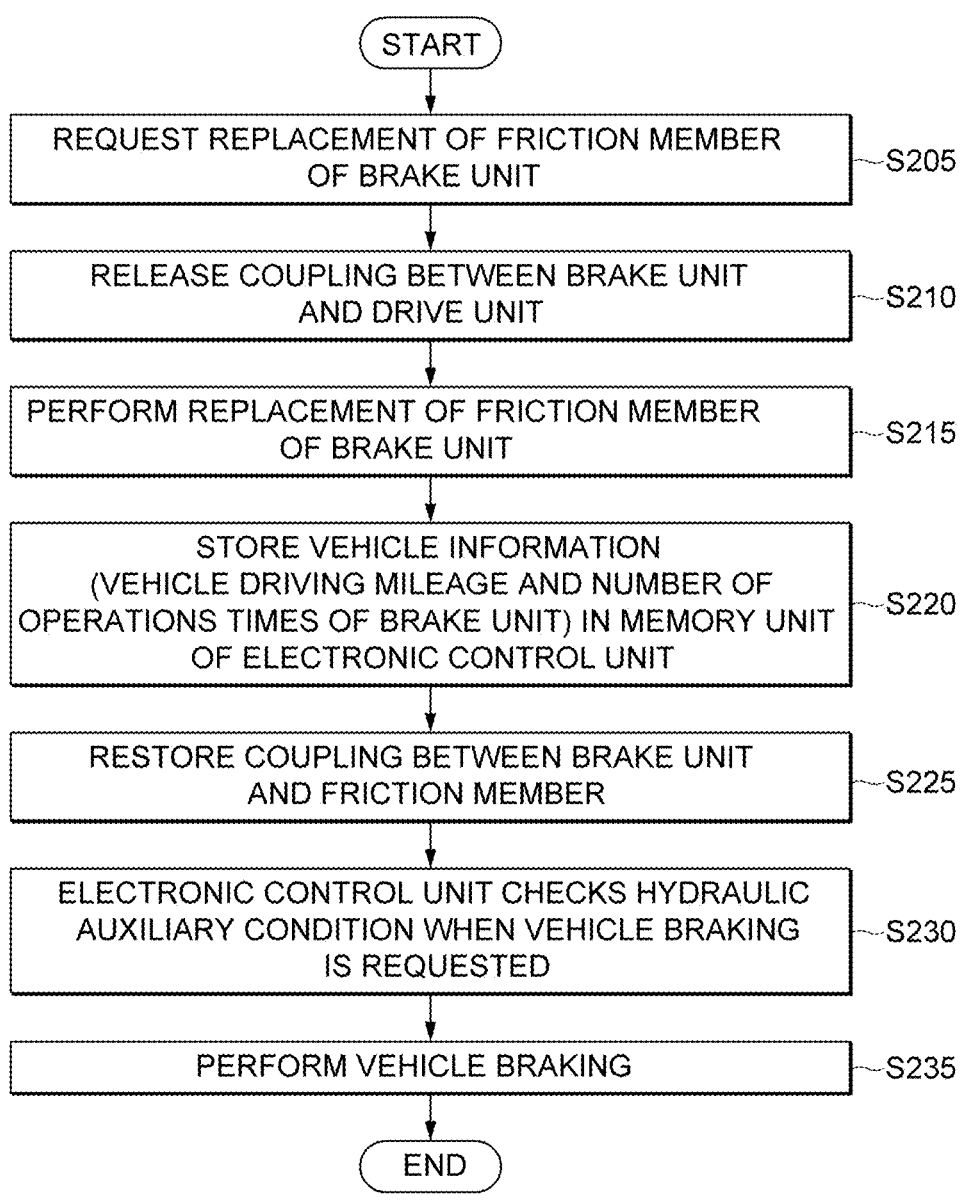

START

REQUEST REPLACEMENT OF FRICTION MEMBER
OF BRAKE UNIT —— S205

RELEASE COUPLING BETWEEN BRAKE UNIT
AND DRIVE UNIT —— S210

PERFORM REPLACEMENT OF FRICTION MEMBER
OF BRAKE UNIT —— S215

STORE VEHICLE INFORMATION
(VEHICLE DRIVING MILEAGE AND NUMBER OF
OPERATIONS TIMES OF BRAKE UNIT) IN MEMORY UNIT
OF ELECTRONIC CONTROL UNIT —— S220

RESTORE COUPLING BETWEEN BRAKE UNIT
AND FRICTION MEMBER —— S225

ELECTRONIC CONTROL UNIT CHECKS HYDRAULIC
AUXILIARY CONDITION WHEN VEHICLE BRAKING
IS REQUESTED —— S230

PERFORM VEHICLE BRAKING —— S235

END

BRAKE SYSTEM AND METHOD FOR CONTROLLING THE SAME

CROSS-REFERENCE TO RELATED APPLICATION

This application claims benefit and priority to Korean Patent Application No. 10-2022-0022412, filed on Feb. 21, 2022, with the Korean Intellectual Property Office, the disclosure of which is incorporated herein in its entirety by reference.

TECHNICAL FIELD

The present disclosure relates to a brake system and a method for controlling the same. More particularly, the present disclosure relates to a brake system and a method for controlling the same, which can control to secure the performance of the brake system after replacing a friction member of a vehicle with a new one.

BACKGROUND

A vehicle is essentially equipped with a brake system for performing braking, and various types of brake systems have been proposed for the safety of a driver and a passenger.

A conventional brake system mainly uses a method in which hydraulic pressure required for braking is supplied to a wheel cylinder using a mechanically connected booster when a driver steps on a brake pedal.

Today, an electromechanical brake system is being developed as a next-generation brake system to receive a driver's brake will in the form of an electrical signal, operate an electrically-driven device such as a motor in response to the received signal, and provide the braking force of the vehicle.

On the other hand, the brake system is provided with a friction member which induces braking, and the friction member should be replaced with a new one when it is worn beyond a certain level. However, the newly replaced friction member has a phenomenon in which the performance of a friction material is deteriorated, so that the performance of the friction member may be recovered to a normal level after driving and braking operations are performed for a certain period of time.

That is, the safety problem of the brake system is posed unless the normal performance of the friction member is secured. Therefore, it is necessary to develop a method capable of securing parking performance, safety, and stability of a vehicle even after replacing the friction member with a new one.

SUMMARY

In view of the above, the present disclosure provides a brake system and a method for controlling the same, which can control to secure the performance of the brake system by setting hydraulic auxiliary conditions when performing braking after replacing a friction member of a vehicle, on the basis of information of the vehicle before replacing the friction member, and further applying auxiliary hydraulic pressure for a predetermined reference period.

According to an embodiment of the present disclosure, the present disclosure provides a brake system including a brake unit including a friction member to perform braking according to a driver's request while a vehicle is driving, a drive unit receiving a rotating force of an actuator and providing a driving force to the brake unit, a hydraulic supply unit providing a hydraulic pressure to the drive unit, and an electronic control unit configured to control an operation of the actuator and the hydraulic supply unit, and the electronic control unit may include a memory unit to store vehicle information at a replacement time when the friction member is replaced.

Further, the memory unit may store a hydraulic auxiliary condition on the basis of the vehicle information, and the electronic control unit may control to further apply a set auxiliary hydraulic pressure from the hydraulic supply unit if the hydraulic auxiliary condition is satisfied when the braking of the vehicle is performed after the friction member is replaced.

Further, the brake unit may include any one of a disc brake and a drum.

Further, the friction member may include any one of a friction pad and a lining.

Further, the vehicle information may include a vehicle driving mileage and a number of operation times of the brake unit.

Further, the hydraulic auxiliary condition may be to determine whether the mileage of the running vehicle after the friction member is replaced exceeds a set mileage on the basis of the vehicle driving mileage stored in the memory unit.

Further, the hydraulic auxiliary condition may be to determine whether the number of operation times of the brake unit of the running vehicle after the friction member is replaced exceeds a set number of operation times on the basis of the number of operation times of the brake unit stored in the memory unit.

According to another embodiments of the present disclosure, the present disclosure provides a method for controlling a brake system including a) replacing a friction member of a brake unit, b) storing vehicle information at a replacement time of the friction member in a memory unit of an electronic control unit, c) releasing a coupling of the brake unit and a drive unit, d) replacing the friction member of the brake unit, and e) checking a hydraulic auxiliary condition stored in the electronic control unit when braking is requested while the vehicle is running after the friction member is replaced.

Further, if the hydraulic auxiliary condition is satisfied in e), the electronic control unit may control such that a hydraulic supply unit for supplying a hydraulic pressure to the drive unit further applies a set auxiliary hydraulic pressure.

Further, if the hydraulic auxiliary condition is not satisfied in e), the electronic control unit may control such that the hydraulic supply unit for supplying the hydraulic pressure to the drive unit applies only a preset hydraulic pressure.

Further, the vehicle information stored in b) may include a vehicle driving mileage and a number of operation times of the brake unit.

Further, e) may include e-1) determining whether the mileage of the running vehicle after replacement of the friction member exceeds a set mileage on the basis of the stored vehicle driving mileage.

Further, e) may further include e-2) determining whether the number of operation times of the brake unit of the running vehicle after replacement of the friction member exceeds a set number of operation times on the basis of the stored number of operation times of the brake unit.

The method may further include restoring a coupling between the brake unit and the drive unit, prior to e).

Details of other embodiments are included in the detailed description and drawings.

A brake system and a method for controlling the same according to the present disclosure have the following effects.

First, it is possible to secure braking performance and safety by storing vehicle information when a friction member is replaced, and further applying auxiliary hydraulic pressure for a predetermined reference period on the basis of this information.

Second, the present disclosure can be applied to various types (caliper type and drum type) of brake systems without being limited to any one type of brake system, by realizing a system which can further apply auxiliary hydraulic pressure through control logic.

BRIEF DESCRIPTION OF THE DRAWINGS

FIG. 3 is a block diagram showing a method for controlling a brake system according to the present disclosure.

DETAILED DESCRIPTION

Figure 1:
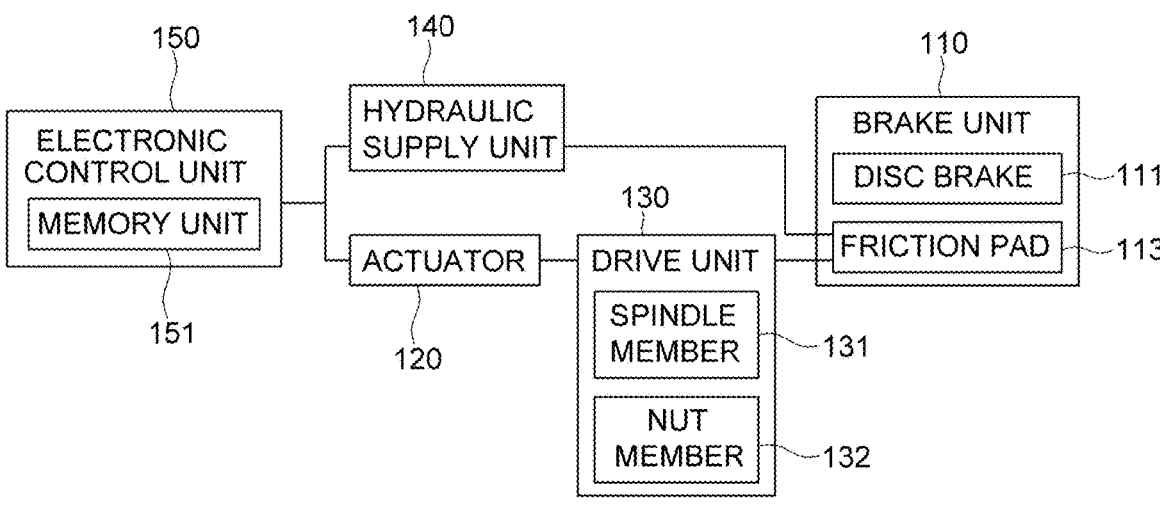
FIG. 1 is a block diagram showing the configuration of a brake system according to an embodiment of the present disclosure.

Hereinafter, embodiments of the present disclosure will be described in detail such that those skilled in the art can easily practice the present disclosure with reference to the accompanying drawings. However, the present disclosure may be implemented in various ways without being limited to particular embodiments described herein.

It is to be noted that the drawings are schematic and are not drawn to scale. The size or shape of components shown in the drawings may be exaggerated for the clarity and convenience of description. Any dimensions are merely illustrative and not limiting. Furthermore, the same reference numerals are used throughout the drawings to designate the same or similar components.

The embodiments of the present disclosure specifically represent ideal embodiments. As a result, various variations of the diagram are expected. Therefore, the embodiment is not limited to the specific shape of an illustrated region, and also covers the modification of the shape by manufacturing.

Hereinafter, a brake system according to the present disclosure will be described in detail with reference to FIGS. 1 and 2.

The brake system according to the present disclosure includes a brake unit 110, an actuator 120, a drive unit 130, a hydraulic supply unit 140, and an electronic control unit 150.

The brake unit 110 is a component which performs braking according to a driver's request while driving the vehicle. First, the brake unit 110 according to this embodiment will be described by taking a caliper type as an example. The brake unit 110 includes a disc brake 111 and a friction pad 113.

The disc brake 111 is rotatably connected to a wheel (not shown) of the vehicle. The friction pad 113 may contact the rotated disc brake 111 to stop the rotation of the disc brake 111, thus braking the vehicle.

Although not shown in detail in the drawing, the friction pad 113 is provided on each of front and rear sides of the disc brake 111.

The brake unit 110 is operated by the drive unit 130. To be more specific, the friction pad 113 is moved toward the disc brake 111 by the driving force supplied from the drive unit 130.

The drive unit 130 includes a spindle member 131 and a nut member 132. The drive unit 130 is operated by the rotating force of the actuator 120 transmitted thereto. To be more specific, the spindle member 131 is rotated by the rotating force of the actuator 120 transmitted thereto. The spindle member 131 may not only rotated in one direction but also be rotated forward and backward.

The nut member 133 is coupled to the spindle member 131. The nut member 133 may be fastened to the spindle member 131 through a screw-type fastening method to move forward or backward according to the rotating direction of the spindle member 131.

For example, the nut member 133 may move forward when the spindle member 131 rotates forward, and the nut member 133 may move backward when the spindle member 131 rotates backward. If the nut member 133 moves forward, the friction pad 113 moves close to the disc brake 111. If the nut member 133 moves backward, the friction pad 113 returns to an original position thereof.

Since the above-described operating process of the drive unit 130 is illustrative, the operating process may be performed in a manner opposite to the above-described process without being limited thereto.

The hydraulic supply unit 140 provides hydraulic pressure to the drive unit 130. Although not shown in detail in the drawing, the drive unit 130 further includes a housing (not shown) which surrounds the spindle member 131 and the nut member 133.

That is, the spindle member 131 and the nut member 133 are provided in the internal space of the housing (not shown). The hydraulic supply unit 140 supplies hydraulic pressure to the internal space of the housing (not shown).

The hydraulic pressure supplied to the internal space of the housing (not shown) acts on the nut member 133. To be more specific, this provides power for moving the nut member 133 forward.

That is, the drive unit 130 provides the driving force to the brake unit 110 through the rotating force transmitted from the actuator 120 and the pressure transmitted from the hydraulic supply unit 140.

The electronic control unit 150 controls the operation of the actuator 120 and the hydraulic supply unit 140. The actuator 120 generates a rotating force according to a current value applied by the electronic control unit 150 and then transmits the rotating force to the drive unit 130.

The hydraulic pressure supplied to the drive unit 130 from the hydraulic supply unit 140 is preset by the electronic control unit 150. The hydraulic supply unit 140 according to this embodiment further provides a set auxiliary hydraulic pressure in addition to the preset hydraulic pressure when braking is required after the friction pad 113 is replaced with a new one.

The preset hydraulic pressure and the set auxiliary hydraulic pressure supplied by the hydraulic supply unit 140 are stored in the electronic control unit 150. The electronic control unit 150 controls such that the hydraulic supply unit 140 supplies only the preset hydraulic pressure or both the preset hydraulic pressure and the set auxiliary hydraulic pressure according to the control logic. In this regard, the control method of the brake system will be described below in detail.

On the other hand, the electronic control unit 150 includes a memory unit 151. The memory unit 151 stores information about the vehicle. To be more specific, the memory unit stores the vehicle information at the replacement time of the friction pad 113 when the friction pad 113 is replaced with a new one.

The vehicle information includes a vehicle driving mileage and the number of times the brake unit 110 is operated. That is, the vehicle driving mileage and the number of times the brake unit 110 is operated immediately before the friction pad 113 is replaced are stored.

Further, a set driving mileage and a set number of operation times are stored in the memory unit 151. The set driving mileage and the set number of operation times stored in the memory unit 151 become a reference as to whether the hydraulic supply unit 140 applies the set auxiliary hydraulic pressure after the friction pad 113 is replaced.

Figure 2:
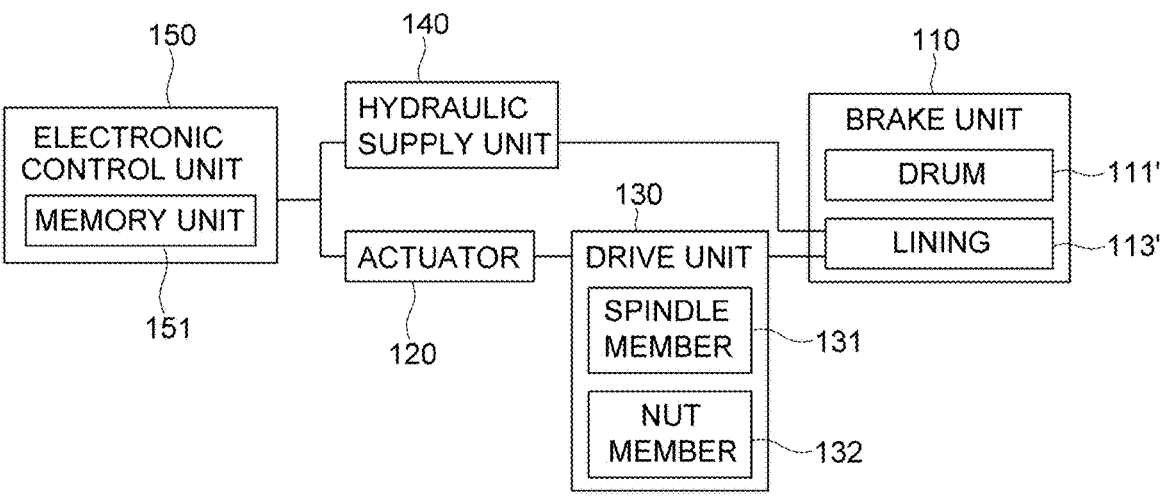
FIG. 2 is a block diagram showing the configuration of a brake system according to another embodiment of the present disclosure.

FIG. 2 shows the configuration of a brake system according to another embodiment the present disclosure.

Referring to FIG. 2, the brake system according to another embodiment includes a brake unit 110', an actuator 120, a drive unit 130, a hydraulic supply unit 140, and an electronic control unit 150, similarly to the brake system according to the preceding embodiment.

The brake system according to this embodiment remains the same as the preceding embodiment except for the brake unit 110'.

The brake unit according to this embodiment takes a drum type as an example. The drum type of brake unit 110' includes a drum 111' and a lining 113'. As compared to the preceding embodiment, the drum 111' corresponds to the disc brake 111, and the lining 113' corresponds to the friction pad 113. That is, while the lining 113' contacts the drum 111', the braking of the vehicle is performed.

The drive unit 130 is operated by the rotating force supplied by the actuator 120, and the lining 113' is moved to contact the drum 111' by the driving force generated by the spindle member 131 and the nut member 133 of the drive unit 130.

At this time, the driving unit 130 provides the driving force, and simultaneously the hydraulic supply unit 140 also provides hydraulic pressure to the brake unit 110'.

The above-described operation of the actuator 120 and the hydraulic supply unit 140 is controlled by the electronic control unit 150. The electronic control unit 150 stores, in the memory unit 151, vehicle information including the vehicle driving mileage and the number of operation times of the brake unit at the replacement time of the lining 113' when the lining 113' is replaced.

If a braking request is input from a driver while the vehicle is driving after the lining 113' is replaced, the electronic control unit 150 controls such that the hydraulic supply unit 140 supplies only the preset hydraulic pressure or both the preset hydraulic pressure and the set auxiliary hydraulic pressure according to the control logic.

Hereinafter, the control method of the brake system according to the present disclosure will be described with reference to FIG. 3.

When the lifespan of the friction member 113 or 113' of the brake unit 110 or 110' expires and replacement is required, the driver receives a request for replacement of the friction member 113 or 113' from a vehicle (not shown) (step S205). For example, a notification indicating the replacement of the friction member 113 or 113' may be displayed on a dashboard (not shown) of the vehicle (not shown).

Although it has been described that the replacement time of the friction member 113 or 113' is informed from the vehicle (not shown), the present disclosure is not limited thereto. When the driver feels that the brake system does not operate normally while the vehicle (not shown) is driving, the driver may recognize that the friction member 113 or 113' needs to be replaced.

When the driver confirms the replacement request signal of the friction member 113 or 113', the driver visits a service center for repairing the vehicle so as to replace the friction member 113 or 113' with a new one.

In the process of replacing the friction member 113 or 113', first, a coupling between the brake unit 110 or 110' and the drive unit 130 is released (step S210).

After the coupling between the brake unit 110 or 110' and the drive unit 130 is released, the replacement of the friction member 113 or 113' is performed (step S215). While the replacement of the friction member 113 or 113' is performed, the vehicle information, i.e. the vehicle driving mileage and the number of operations times of the brake unit are stored in the memory unit 151 of the electronic control unit 150 (step S220).

Specifically, the number of operation times of the brake unit 110 or 110' from time when the friction member to be replaced is first operated to time just before the friction member is replaced is stored.

The process of storing the vehicle information in the memory unit 151 is performed by a worker who replaces the friction pad 113 or 113' with a new one. That is, the worker replaces the friction pad 113 or 113', and vehicle information at the time of replacement of the friction pad 113 or 113' is stored in the memory unit 151.

When the replacement of the friction pad 113 or 113' is completed and the vehicle information is stored in the memory unit 151, the coupling between the brake unit 110 or 110' and the drive unit 130 is restored (step S225).

When the braking request occurs while the vehicle is running after the friction pad 113 or 113' is replaced, the electronic control unit 120 checks the hydraulic auxiliary conditions (step S230) and brakes the vehicle (step S235).

Figure 4:
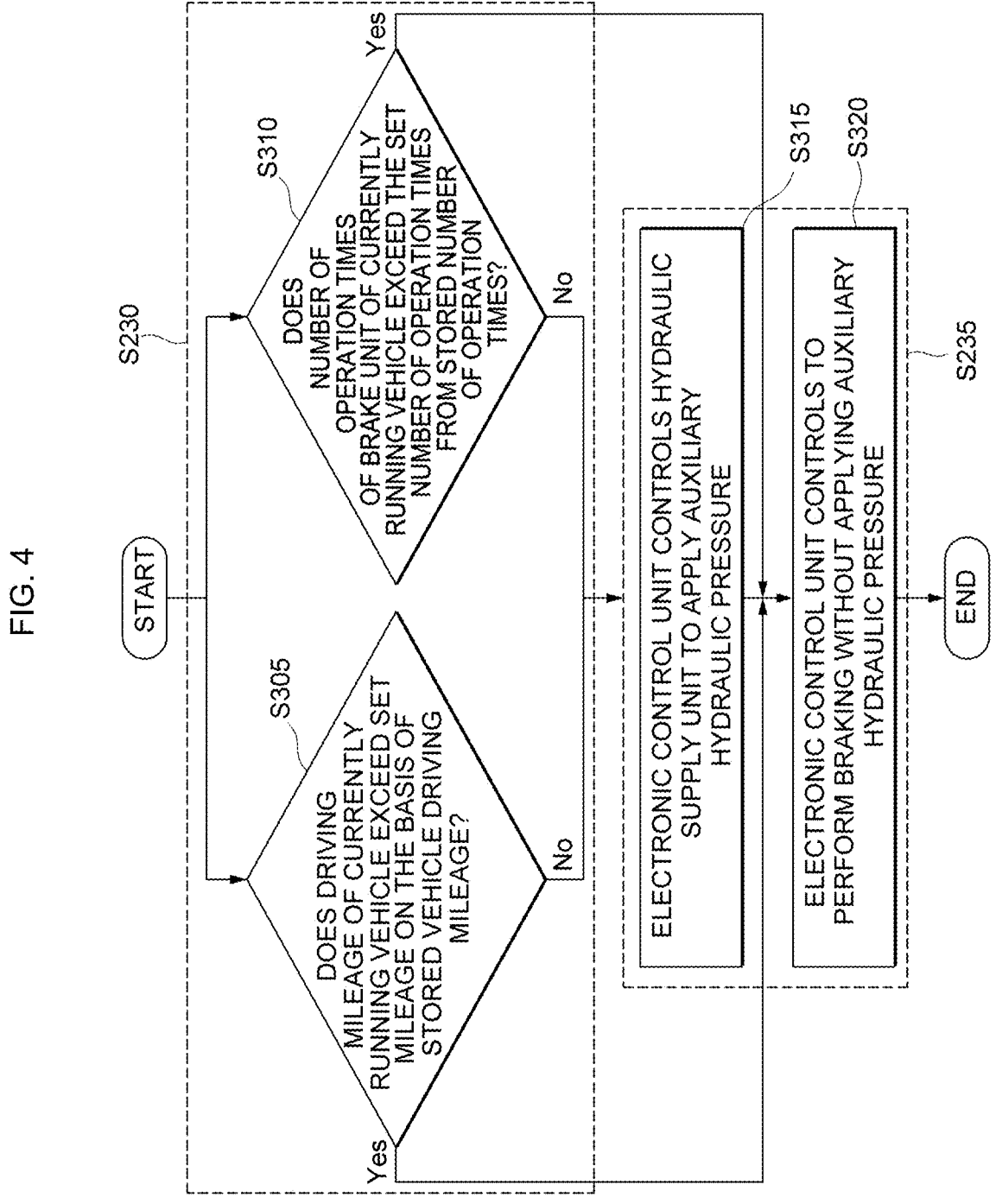
FIG. 4 is detailed block diagram showing some processes of FIG. 3.

Meanwhile, the process of checking the hydraulic auxiliary conditions and performing braking will be described in more detail with reference to FIG. 4.

When the braking request is generated while the vehicle is driving, the driver steps on the pedal to perform braking. Hereinafter, the hydraulic pressure generated when the driver brakes while stepping on the pedal will be referred to as a preset hydraulic pressure.

At the same time as the preset hydraulic pressure is applied, the electronic control unit 150 checks whether the driving mileage of the currently running vehicle exceeds the set mileage on the basis of the vehicle driving mileage stored in the memory unit 151 (step S305). Alternatively, the electronic control unit 150 checks whether the number of operation times of the brake unit 110 or 110' of the currently running vehicle exceeds the set number of operation times from the number of operation times stored in the memory unit 151 (step S310).

That is, hydraulic-pressure assistance is performed when any one of the vehicle driving mileage and the number of operation times of the brake unit 110 or 110' of the vehicle is not satisfied.

When it is determined in step S305 that the vehicle driving mileage does not exceed the set mileage, the electronic control unit 150 controls to apply both the preset hydraulic pressure and the set auxiliary hydraulic pressure when the hydraulic supply unit 140 supplies the hydraulic pressure to the brake unit 110 or 110' so as to perform braking (step S315).

Further, when it is confirmed in step S310 that the number of operation times of the brake unit 110 or 110' does not exceed the set number of operation times from the number of operation times stored in the memory unit 151, the electronic control unit 150 controls such that the hydraulic supply unit 140 applies both the preset hydraulic pressure and the set auxiliary hydraulic pressure (step S315).

In the friction pad 113 or 113' which is replaced with a new one, the performance of the friction material may be deteriorated. When the electronic control unit 150 controls the actuator 120 and the hydraulic supply unit 140 under the same conditions as existing conditions, braking performance may be deteriorated and safety problems may occur. Therefore, the electronic control unit 150 may cause the hydraulic supply unit 140 to apply the set auxiliary hydraulic pressure along with the preset hydraulic pressure, thus causing the driving unit 130 to generate a larger driving force.

On the other hand, a preset hydraulic pressure generated while the driver steps on the pedal and performs braking may be applied at a value larger than the set auxiliary hydraulic pressure. In this case, since a sufficient fastening force may be provided only with the preset hydraulic pressure even if the conditions for applying the set auxiliary hydraulic pressure in step S305 or step S310 are satisfied, only the preset hydraulic pressure is applied and maintained.

When it is confirmed that the driving mileage of the currently driving vehicle exceeds a value obtained by adding the set driving mileage to the stored vehicle driving mileage in step S305, or the number of operation times of the brake of the currently driving vehicle exceeds a value obtained by adding the set number of operation times to the stored number of operation times of the brake in step S310, the electronic control unit 150 controls such that the hydraulic supply unit 140 and the actuator 120 are operated under a preset condition without the need for the hydraulic supply unit 140 to apply the set auxiliary hydraulic pressure, thus braking the vehicle (step S320).

Although the embodiments of the present disclosure have been described with reference to the accompanying drawings, those skilled in the art to which the present disclosure pertains can understand that the present disclosure can be implemented in different forms without changing the technical spirit or essential features.

Therefore, the above-described embodiments should be understood as illustrative and not restrictive in all respects, and the scope of the present disclosure is defined by the claims that will be described later. All changes or modifications derived from the meaning and scope of the claims and their equivalent concepts should be construed as being included in the scope of the present disclosure.

DETAILED DESCRIPTION OF MAIN ELEMENTS

110, 110': brake unit
111: disc brake
111': drum
113: friction pad
113': lining
120: actuator
130: drive unit
131: spindle member
133: nut member

140: hydraulic supply unit
150: electronic control unit
151: memory unit

What is claimed is:

1. A brake system comprising:
   a brake unit comprising a friction member to perform braking according to a driver's request while a vehicle is driving;
   a drive unit receiving a rotating force of an actuator and providing a driving force to the brake unit;
   a hydraulic supply unit providing a hydraulic pressure to the drive unit; and
   an electronic control unit configured to control an operation of the actuator and the hydraulic supply unit,
   wherein the electronic control unit comprises a memory unit to store vehicle information at a replacement time when the friction member is replaced,
   wherein the memory unit stores a hydraulic auxiliary condition on the basis of the vehicle information, and
   the electronic control unit controls to further apply a set auxiliary hydraulic pressure from the hydraulic supply unit if the hydraulic auxiliary condition is satisfied when the braking of the vehicle is performed after the friction member is replaced.

2. The brake system of claim 1, wherein the brake unit comprises any one of a disc brake and a drum.

3. The brake system of claim 2, wherein the friction member comprises any one of a friction pad and a lining.

4. The brake system of claim 1, wherein the vehicle information comprises a vehicle driving mileage and a number of operation times of the brake unit.

5. The brake system of claim 2, wherein the hydraulic auxiliary condition is to determine whether the mileage of the running vehicle after the friction member is replaced exceeds a set mileage on the basis of the vehicle driving mileage stored in the memory unit.

6. The brake system of claim 5, wherein the hydraulic auxiliary condition is to determine whether the number of operation times of the brake unit of the running vehicle after the friction member is replaced exceeds a set number of operation times on the basis of the number of operation times of the brake unit stored in the memory unit.

7. A method for controlling a brake system comprising:
   a) replacing a friction member of a brake unit;
   b) storing vehicle information at a replacement time of the friction member in a memory unit of an electronic control unit;
   c) releasing a coupling of the brake unit and a drive unit; and
   d) checking a hydraulic auxiliary condition stored in the electronic control unit when braking is requested while the vehicle is running after the friction member is replaced.

8. The method of claim 7, wherein, if the hydraulic auxiliary condition is satisfied in e), the electronic control unit controls such that a hydraulic supply unit for supplying a hydraulic pressure to the drive unit further applies a set auxiliary hydraulic pressure.

9. The method of claim 7, wherein, if the hydraulic auxiliary condition is not satisfied in e), the electronic control unit controls such that the hydraulic supply unit for supplying the hydraulic pressure to the drive unit applies only a preset hydraulic pressure.

10. The method of claim 9, wherein the vehicle information stored in b) comprises a vehicle driving mileage and a number of operation times of the brake unit.

11. The method of claim 10, wherein d) comprises:

d-1) determining whether the milage of the running vehicle after replacement of the friction member exceeds a set mileage on the basis of the stored vehicle driving mileage.

12. The method of claim 10, wherein d) further comprises:

d-2) determining whether the number of operation times of the brake unit of the running vehicle after replacement of the friction member exceeds a set number of operation times on the basis of the stored number of operation times of the brake unit.

13. The method of claim 7, further comprising:

restoring a coupling between the brake unit and the drive unit, prior to e).

* * * * *